United States Patent [19]

Fiege et al.

[11] 4,189,314
[45] Feb. 19, 1980

[54] METHOD OF UTILIZING WASTE DUST AND WASTE SLUDGE FROM BLAST FURNACES AND STEEL WORKS

[75] Inventors: Ludwig Fiege; Hans-Werner Höhle, both of Moers; Wilhelm J. P. Janssen, Mülheim; Klaus-H. Ulrich, Heiligenhaus, all of Fed. Rep. of Germany

[73] Assignee: Fried. Krupp Huttenwerke AG, Bochum, Fed. Rep. of Germany

[21] Appl. No.: 941,004

[22] Filed: Sep. 11, 1978

[30] Foreign Application Priority Data

Sep. 7, 1977 [DE] Fed. Rep. of Germany ....... 2740675

[51] Int. Cl.² ............................................... C21B 1/20
[52] U.S. Cl. ........................................... 75/46; 75/25; 75/44 R
[58] Field of Search .................... 75/25, 46, 43, 44 RS

[56] References Cited

U.S. PATENT DOCUMENTS 4,004,918  1/1977  Fukuoka et al. .......................... 75/25

Primary Examiner—M. J. Andrews
Attorney, Agent, or Firm—J. Harold Nissen

[57] ABSTRACT

A method of utilizing waste dust and waste sludge from blast furnaces and steel works for subsequent steel production comprising forming the waste dust and waste sludge into pellets containing basic gangue and higher sulphur contents and having a metallization degree of over 80% in which up to 10% by weight of the pellets are intimately mixed with liquid pig iron relative to the weight of the pig iron to form a pig iron melt, the pellets being placed into a pig iron charging ladle prior to and/or during the reladling of the liquid pig iron from a torpedo ladle into a charging ladle, and the pig iron is deslagged prior to the pouring thereof into a refining vessel.

10 Claims, No Drawings

METHOD OF UTILIZING WASTE DUST AND WASTE SLUDGE FROM BLAST FURNACES AND STEEL WORKS

BACKGROUND OF THE INVENTION

1. Field of the Invention

This invention is concerned with the utilization of waste dust and waste sludge from blast furnaces and steel works. More particularly, the invention is concerned with the utilization of the aforementioned waste materials without the disadvantageous sulphuration.

2. Description of the Prior Art

It is well known that the problem of dumping the dust and sludge produced in waste gas purification in iron and steel works is worldwide. As the dumping and the disposal of these materials is not viable on either ecological or economical grounds, many attempts have been made to make use of the waste materials. Thus, it was proposed, firstly to form the waste materials into pellets containing basic gangue and having higher sulphur contents at a metallization degree of 80% and to use these pellets in the melting of steel in blast furnaces, see, for example, German Offenlegungsschrift 2,519,810 and "Stahl und Eisen" 1976, Vol. 24, Pages 1228–1233.

In addition to the preferred use of the pellets in blast furnaces, attempt was also made to use the metallized pellets with sulphur contents of approximately 1% as the cooling means in the refining process in LD converters. 10–50 kg of pellets per ton of steel was added. The test melts showed that the sulphur charged with the pellets was absorbed up to 50% by the steel. Therefore, the use of pellets as cooling means is only limited.

The process for producing the pellets is itself part of the prior art (Stahl und Eisen, 1976, Vol. 24, Pages 1228–1233).

SUMMARY OF THE INVENTION

It is therefore an object of the invention to develop a method of utilizing the waste dust and waste sludge from blast furnaces and steel works.

A further of object of the invention is to use larger amounts of the waste material in steel production without the disadvantageous sulphuration.

Yet another object of the invention is to provide a process which enables the production of steels with low sulphur contents, preferably sulphur contents of less than 0.015%, in an easy manner.

The invention proposes to solve the aforesaid problems and accomplish the aforesaid objects by having the pellets intimately intermixed with liquid pig iron, whereby up to 10% by weight of the pellets relative to the weight of pig iron are mixed with the pig iron, and subsequently the pig iron melt is deslagged prior to its being poured into a refining vessel. The intimate mixing of the liquid pig iron with the pellets can be achieved by different steps, either individually or combined. Thus, when the blast furnace is tapped, the pellets can be continuously supplied to a pig iron transport vessel, for instance to a torpedo ladle. Here, it is expedient here to feed the pellets tangentially into the pig iron stream. This results in a favorable swirling motion with the succeeding long precipitation possibility of the slag constituents.

However, it is particularly advantageous to place the pellets into the pig iron charging ladle prior to and/or during the reladling of the liquid pig iron from the torpedo ladle into the pig iron charging ladle. This also results in a favorable swirling and in the additional advantage that a part of the slag moving with the tapping of the blast furnace is already in the torpedo ladle, thus providing more favorable discharge conditions for the separation process of the sulphur-containing pellets used. It must be taken into consideration that more than 0.5 weight %, preferably more than 3.5 weight % and in particular more than 5.5 weight % of pellets are added in respect of the weight of the liquid pig iron. In the case of very large quantities, the process steps can also be combined by, for example, adding up to one third of the total amount of the pellets on tapping the blast furnace and more than two thirds when the pig iron is being reladled from the charging ladle into the torpedo ladle. This combination allows particularly large amounts of pellets to be added without disadvantages regarding the aimed low sulphur contents arising for later steel production.

In the invention, pellets with sulphur contents of over 0.5 weight % and in particular over 1.0 weight % are used. For expedience, the dimensions of the pellets are 1–10 mm, and in particular 3–7 mm. When using larger amounts of pellets, it may be expedient to tap the pig iron at a temperature which is elevated by at least 20° over the average temperature. For example, when a usual pig iron melt (4.0–4.7 weight % carbon; 0.6–1.04 weight % silicon) is tapped, it should be tapped at a temperature of at least 1300° C., and preferably at least 1360° C.

The method according to the invention surprisingly does not lead to a sulphuration of the pig iron melt. The intimate mixing of the pellets and pig iron leads to separation of the sulphur-containing basic gangue and iron without the high sulphur content of the pellets being absorbed by the pig iron melt. After the pellets have been intimately mixed with the pig iron and dissolved therein, the light gangue is precipitated off from the pig iron and floats on the top. The floating high-sulphur-content slag is deslagged prior to the reladling of the pig iron melt into the refining vessel, e.g. an LD converter, so that the process according to the invention permits the production of steels with very low sulphur contents.

If particularly low sulphur contents are aimed at for the steel, e.g. sulphur contents of 0.010 weight % at maximum, it may be expedient for the pig iron to undergo desulphurization treatment with $CaC_2$, e.g. according to the immersion lance process. It has been shown that the gangue floating on the top of the pig iron charging ladle does not impair the known desulphurization process. The method according to the invention has the advantage that metallized pellets containing sulphur-containing, basic gangue and iron are separated in an easy and simple manner without sulphuration resulting in the steel production or without particularly high cold compression strength of the pellets being necessary, as is the case when used in the blast furnace. The degree of metallization of the pellets is preferably between 90% and 95%. During the production of the pellets suitable for the process, it must be ensured that the basicity of the starting material is sufficiently high, i.e. the basicity should lie approximately between 1.5 and 6. Should there not be sufficient LD dust, then other base carriers, such as limestone, calcium hydroxide, dolomite or the like, are added.

DESCRIPTION OF THE PREFERRED EMBODIMENTS

A more detailed explanation of the invention follows in connection with the following examples which describes the preferred and best modes of carrying out and performing the process of the invention.

EXAMPLE I 5 tons of pellets were added to a pig iron melt weighing 275 tons when the liquid pig iron was being reladled into the pig iron charging ladle. The pellets had a metallization degree of 94%, a sulphur content of 1.1% and a basic gangue consisting substantially of CaO. 1 ton of pellets were supplied onto the floor of the pig iron charging ladle prior to the reladling of the liquid pig iron, and the remaining 4 tons were continuously added during the reladling.

The pig iron analysis prior to and after the reladling was as follows:

| C | Si | Mn | P | S | Temp. | Point where sample taken |
|---|---|---|---|---|---|---|
| 4.3 | 0.49 | 0.67 | 0.087 | 0.040 | 1360° C. | torpedo ladle |
| 4.3 | 0.48 | 0.67 | 0.087 | 0.040 | 1350° C. | Pig iron transport vessel after mixing. |
| 4.3 | 0.44 | 0.67 | 0.087 | 0.017 | 1324° C. | Pig Iron transport ladle after desulphurization with 700kg CaC$_2$ (immersion lance process). |
| 0.09 | — | 0.16 | 0.010 | 0.014 | 1622° C. | 1st sample in converter after normal blowing. |

EXAMPLE II 15.2 tons (5.6%) of pellets were continuously added to 275 tons of pig iron while the pig iron was being reladled into the charging ladle. The composition of the pellets was as stated in Example 1.

| C | Si | Mn | P | S | Temp. | Point where sample taken |
|---|---|---|---|---|---|---|
| 4.4 | 0.75 | 0.72 | 0.110 | 0.034 | 1410° C. | torpedo ladle |
| 4.4 | 0.72 | 0.73 | 0.110 | 0.036 | 1360° C. | pig iron transport vessel after mixing |
| 4.3 | 0.74 | 0.72 | 0.110 | 0.008 | 1335° C. | pig iron transport ladle after desulphurization with 2000 kg CaC$_2$ (immersion lance process) |
| 0.07 | — | 0.18 | 0.009 | 0.010 | 1634° C. | 1st sample in converter after normal blowing |

Example II makes clear that low sulphur contents of 0.010% maximum can be realized in practice even when large amounts of pellets are added.

While the presently preferred embodiments have been disclosed, it will be obvious to those skilled in the art that various changes and modifications may be made therein without departing from the scope of the invention.

We claim:

1. In a method for subsequent steel production of utilizing waste dust and waste sludge from blast furnaces and steel works having a refining vessel and a pig iron charging ladle comprising forming the waste sludge into pellets containing basic gangue and higher sulphur contents and having a metallization degree of over 80%, the improvement comprising:

placing said pellets into said pig iron charging ladle and intimately mixing up to 10% by weight of said pellets with liquid pig iron relative to the weight of the pig iron to form a pig iron melt, and deslagging the pig iron melt prior to the pouring thereof into said refining vessel.

2. In the method as claimed in claim 1, said steel works including a tropedo ladle wherein
said pellets are placed into said pig iron charging ladle prior to the reladling of the liquid pig iron from said torpedo ladle into said charging ladle.

3. In the method as claimed in claim 1 said steel works including a torpedo ladle, wherein,
said pellets are placed into said pig iron charging ladle during the reladling of the liquid pig iron from said torpedo ladle into said charging ladle.

4. In the method as claimed in claim 1, said steel works including a torpedo ladle, wherein
said pellets are placed into said pig iron charging ladle both prior to and during the reladling of the liquid pig iron form said torpedo ladle into said charging ladle.

5. In a method as claimed in claim 1, wherein the pellets are fed tangentially into the pig iron, when streaming into a ladle.

6. In a method as claimed in claim 1, wherein at least 0.5% by weight of said pellets are mixed with said pig iron.

7. In a method as claimed in claim 1 including a torpedo ladle, wherein up to one third of the total amount of pellets are added on tapping of the blast furnace and more than two-thirds of the total amount of pellets is added when reladling the pig iron from its charging ladle into the torpedo ladle.

8. In a method as claimed in claim 1 or 7, wherein the pig iron is tapped at a temperature of at least 1300° C.

9. In a method as claimed in claim 1, wherein the basicity of the starting material for the pellets is between approximately 1.5 and 6.

10. In a method as claimed in claim 1, wherein at least 5.5% by weight of said pellets are mixed with said liquid pig iron.

* * * * *